(12) United States Patent
Behrens

(10) Patent No.: US 6,434,340 B1
(45) Date of Patent: Aug. 13, 2002

(54) METHOD OF RECORDING DATA ON PHOTOGRAPHIC FILM

(75) Inventor: Andreas Behrens, Langenfeld (DE)

(73) Assignee: Robot Foto und Electronic GmbH, Dusseldorf (DE)

( * ) Notice: Subject to any disclaimer, the term of this patent is extended or adjusted under 35 U.S.C. 154(b) by 0 days.

(21) Appl. No.: 09/548,070

(22) Filed: Apr. 12, 2000

(30) Foreign Application Priority Data

Apr. 14, 1999 (DE) .......................... 199 16 793

(51) Int. Cl.[7] .............................. G03B 17/24
(52) U.S. Cl. .................. 396/311; 396/318; 355/40; 340/937
(58) Field of Search ................ 396/311, 318, 396/315, 316, 319; 355/40, 41; 352/92, 6; 340/936, 937

(56) References Cited

U.S. PATENT DOCUMENTS

| 3,603,227 A | | 9/1971 | Maronde | |
|---|---|---|---|---|
| 3,849,784 A | | 11/1974 | Holzapfel | |
| 4,958,174 A | * | 9/1990 | Goto et al. | 396/318 |
| 4,965,628 A | * | 10/1990 | Olliver et al. | 355/41 |
| 4,988,994 A | * | 1/1991 | Loeven | 340/936 |
| 5,041,828 A | | 8/1991 | Loeven | |
| 5,128,702 A | * | 7/1992 | Ogawa et al. | 396/318 |
| 5,563,590 A | * | 10/1996 | Mira | 340/936 |
| 5,896,403 A | * | 4/1999 | Nagasaki et al. | 371/37.1 |
| 5,933,213 A | * | 8/1999 | Siemer et al. | 355/40 |
| 5,935,190 A | * | 8/1999 | Davis et al. | 701/119 |

FOREIGN PATENT DOCUMENTS

DE    3034161 A1    4/1982

* cited by examiner

Primary Examiner—David M. Gray
(74) Attorney, Agent, or Firm—Lawrence G. Fridman

(57) ABSTRACT

In a method for traffic monitoring, data related to a traffic situation is measured. A picture of a traffic scene related to the traffic situation is generated on a photographic film. The data is recorded on the photographic film by converting the data to a first set of binary energizing signals which is energizing recording arrangements, so as to generate a numeric or alphanumeric representation of the data on the film in a first recording field thereof. The data is converted to a second set of binary energizing signals which energizes a recording arrangement, so as to generate a neither numeric nor alphanumeric pattern on the film in a second recording field.

15 Claims, 5 Drawing Sheets

METHOD OF RECORDING DATA ON PHOTOGRAPHIC FILM

BACKGROUND OF THE INVENTION

The invention relates to a method of recording data on a photographic film.

The invention can be used for recording time and/or measuring data in photographic traffic monitoring installations.

Photographic traffic monitoring installations, by means of a photographic camera, document violations of traffic regulations. The photographic camera provides a photograph of a traffic scene with a vehicle under observation. Furthermore, data are generated giving, for example, time and location of the taking of the photograph, and the measured speed. Also these data have to be documented or recorded conclusively. This is done by reflecting the data into the photographic picture or by otherwise recording the data to the film.

U.S. Pat. No. 5,041,828 discloses an example of a traffic monitoring installation.

U.S. Pat. Nos. 5,603,227 and 3,849,784 disclose photographic trafic monitoring devices by which an image of instruments showing time and/or speed is generated in a corner of the taken photograph by means of an auxiliary lens and a reflecting prism.

German patent 3,034,161 discloses a photographic camera with an optical writing head. The optical writing head has a LED-matrix which is imaged on the margin of the film. The data to be recorded, such as the time and date when the photograph was taken, are converted to a set of binary energizing signals. These signals consecutively energize the LEDs (light emitting diodes) of the LED-matrix during the feeding of the film. Thereby alphanumeric characters are consecutively generated by the LED-matrix and are recorded on the film margin as written information. According to German patent, there is a two-dimensional array of LEDs, i.e. a LED-matrix, which generates the complete characters one by one.

Instead, the optical writing head may also use a linear array of LEDs, whereby each character is composed of consecutively "printed" colums.

Such photographic recordings on the film cannot be manipulated. Therefore they are acknowledged as evidence in court trials.

Furthermore, scanners are known for scanning the photographs made by a traffic monitoring installation and to convert the photograph to a "digital picture". By such a scanner, a brightness value in digital form is provided for each picture element (pixel). To this end, the picture on the photographic film is imaged on an image resolving sensor, which contains either a two-dimensional array of sensor elements or a line of sensor elements by which the picture is scanned line-by-line. Such "digital pictures" can then be subjected to picture processing, for example in order to automatically read the licence plate of a photographed vehicle.

When the photograph is scanned, also the data reflected into the photograph or applied to the margin of the film have to be read. Picture processing programs exist which permit a computer to "read" a writing scanned as a picture pixel-by-pixel, i.e. convert this writing to the binary code words associated with the various characters. In practice, this reading of the small characters applied to the film margin presents problems. There are reading errors. Such reading errors jeopardize the operability of the whole system, as the data, like the measured speed in a traffic monitoring installation, are highly relevant for imposing a fine to the driver or, maybe, for prosecuting the driver for reckless driving. It has been attempted to solve this problem by adding a test sum to the data, this test sum indicating reading errors. The result of this, however, is, at most, that misread pictures are discarded and not processed further.

DISCLOSURE OF THE INVENTION

It is an object of the invention to make the reading of data which have been applied to a photographic film more reliable.

To this end, in addition to a numeric or alphanumeric representation of the data, an additional field is provided on the film.

Thus, the data is applied to the film, on one hand, in a human-readable format as letters or numbers. On the other hand, the data is additionally applied to the film in another format which simplifies reading of the data and makes it more reliable. Reading errors can be virtually avoided.

An embodiment of the invention is described below with reference to the accompanying drawings.

DESCRIPTION OF PREFERRED EMBODIMENT

Figure 1:
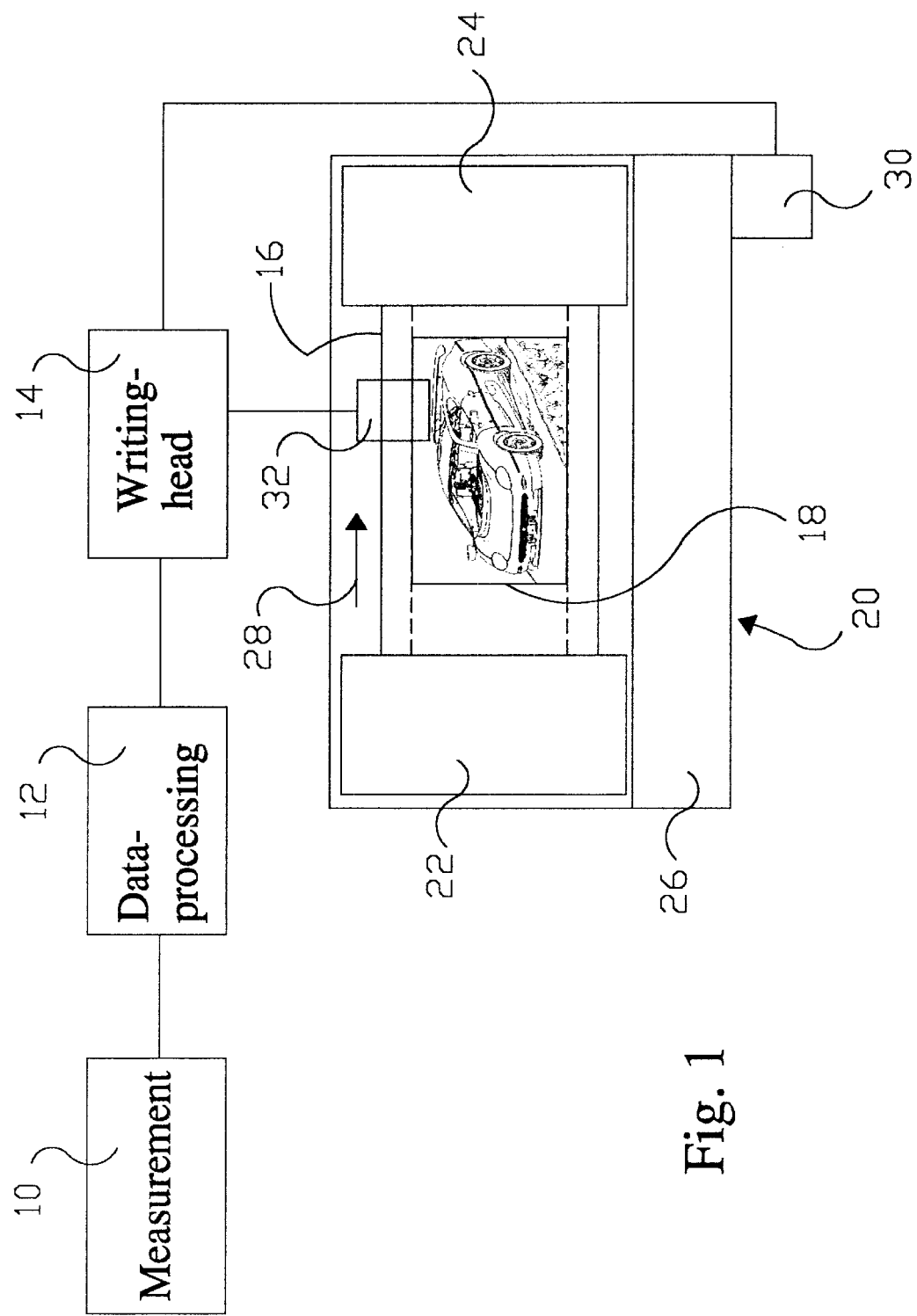
FIG. 1 is a schematic illustration of a photographic camera and of the equipment for photographically applying a data representation on the margin of a film, the representation permitting scanning by a reading device.

Referring to FIG. 1, numeral 10 designates a measuring device of a traffic monitoring installation monitoring the speed of vehicles. The measuring device provides data. These data are, first of all, the measured speeds. In addition, the measuring device provides time information, i.e. date and local time. Other data could, for instance, be the location at which the traffic monitoring installation is installed. These data are processed in a data processing unit 12. The data processing unit 12 generates data for energizing a LED-matrix of a writing head 14. The writing head 14 serves to reflect data representations onto the margin 16 of a Film 18 in a photographic camera 20. The photographic camera 20 photographs, as shown, a traffic scene or situation with a vehicle to be monitored, on the central portion of the film 18. Associated data, such as speed, date and local time, are applied to the margin 16 of the film 18 by means of the writing head 14 also photographically, i.e. by illuminating a light-sensitive emulsion.

Numerals 22 and 24 designate supply and take-up spools, respectively, of the camera 20. After each photograph of the traffic scene, the film is drawn by a film drive motor 26 from the supply spool 22 and is wound on the take-up spool 24. Thus after each photograph, there is a film feeding in a film feeding direction illustrated by an arrow 28. During this film feeding, the data representation is applied to the margin 16 of the film.

To this end, the writing head 14 receives a pulse sequence from a pulse generator 30, this pulse sequence representing the motion of the film 18 during the film feeding. Each pulse represents a distance increment of the film 18 during the film feeding. The pulse sequence energizes the writing head 14 in such a way that the LED-matrix consecutively represents the characters provided by the data processing unit 12. These characters or data representations are then consecutively reflected and imaged by means of a reflecting device 32 onto the margin 16 of the film 18, during the film feeding.

The signal processing unit and writing head may be of similar design as shown in the above mentioned German patent 3,034,161.

Figure 2:
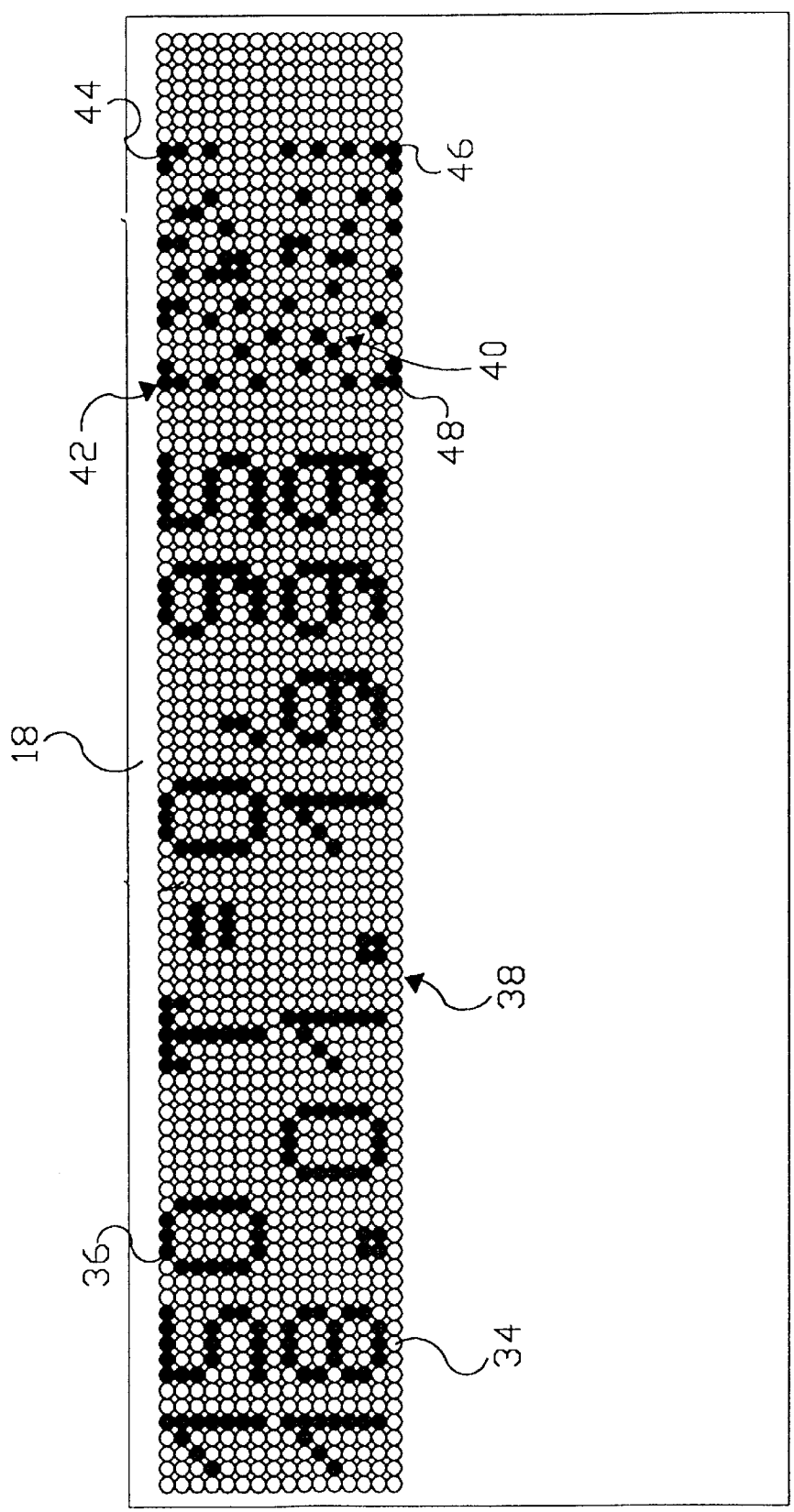
FIG. 2 shows a data representation applied with the device of FIG. 1.

FIG. 2 is an example of a data representation generated in this way.

The grid of small circles such as 34 corresponds to the grid of light emitting diodes in the LED-matrix of the writing head 14. If a LED of the LED-matrix is energized and lit, the margin 16 of the film 18 is blackened at this spot, as for example, shown at 36. In this way, characters or other data representations can be generated on the margin 16 of the film 18, by appropriate energization of the LEDs. German patent 30 34 161 discloses a LED-matrix with a two dimensional array of light emitting diodes, whereby the matrix is able to represent a complete character such as a "1" or a "T" at a time in an associated field. Instead, also a one-dimensional array of LEDs can be provided, which "writes" the individual columns of the field consecutively.

Referring to FIG. 2, the data is reflected into a field 38 by means of LEDs in an alphanumeric writing, which can be easily read by men, and are applied photographically to the film. In FIG. 2, this data reflects speed, time and date. In addition, a field 40 is provided, in which the data is represented in a format, which, when the field is scanned later by means of a "scanner", can be read without reading errors by the scanner and the computer.

The field 40 is rectangular. The corners of the field are marked, each one by four sets of three blackened dots defining a right angle, independently of the data to be represented Points or dots are defined within this rectangle, each point in FIG. 2 corresponding to one of a circle 34 of the grid. The blackening or non-blackening of this point or dot provides data-dependent information. In field 40, the data representation can be provided redundantly, as it requires less area. This increases the reliability of the reading-out procedure.

With the described mode of data representation, the illuminated points are applied to the margin 16 of the film 18 during film feeding, thus when the film is in motion. Therefore, the relative positions of the dots depends on the speed of the film feeding and, therefore, is not as accurately defined as, for example, by printing the marks on paper during a printing process. Depending on the speed of the film feeding, the rectangle can be slightly longer or shorter than a nominal value. This might result in errors, when the pattern is read by a reading head. Also the column distances of the LED-matrix may be different from camera to camera.

For this reason, the following procedure is followed, when the data are read:

The side length of the rectangle in film feeding direction is determined from the distance of corners of the rectangle, the corners being marked by the sets 42 and 44 of blackened dots. The coordinates of the points or spots defined in the field to be tested for blackening or non-blackening are not fixed from the first but are determined from the side length thus determined. There are m columns provided in the rectangle, thus, the side length is divided by m. This provides the column distance. Then a point in the $n^{th}$ column has the abscissa nS/m. This location is tested for "blackened" or "non-blackened".

A similar procedure can also be used to determine the "ordinates" of the points normal to the film feeding direction, in order to take into account tolerances of the height of the LED-matrix or of the length of a LED-column, which might be different from camera to camera.

Figure 3:
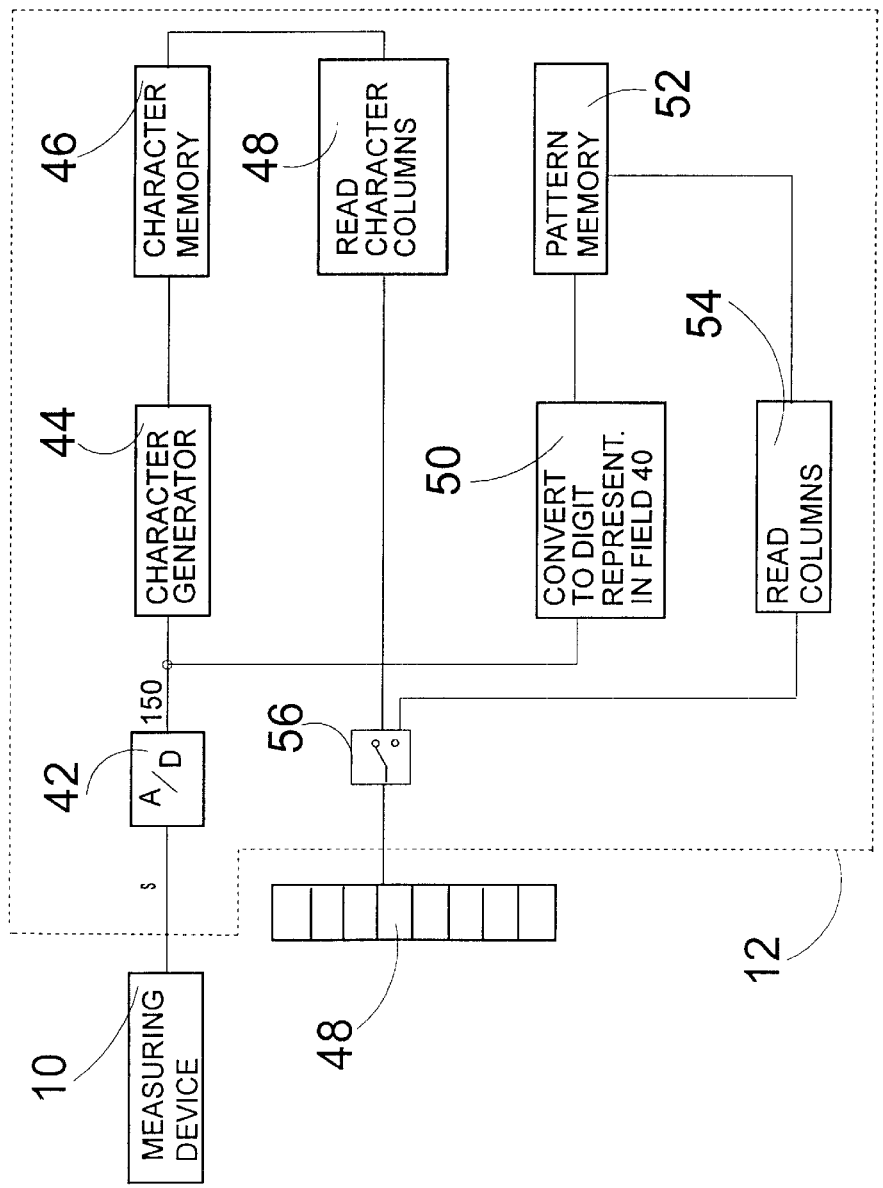
FIG. 3 is a block diagram illustrating the writing head.

FIG. 3 is a block diagram and illustrates the recording of a measured values on the margin 16 of the film 18, as illustrated in FIG. 2.

Referring to FIG. 3, numeral 10 again illustrates the neasuring device. The measures value such as a speed s is applied to an anolog-to digital converter 42. The analog-to-digital converter 42 provides a digital signal, for example in the ASCII code, which is applied to a character generator 44. The character generator 44 generates, from the digital input a pattern ob binary states representing, if displayed, the character in human readable way. Actually this character generator is a ROM, which is addressed by the digital input data and provides a pattern of binary row and column output signals. This pattern is stored in a character memory 46. The character memory 46 is then read out column-by-column by reading means. The binary signals columns of the pattern are then, consecutively, applied to a linear array 48 of light emitting diodes. Thereby, the light emitting diodes of the array are energized in consecutive patterns such that, when the film 18, during film feeding, moves past the light emitting diodes of the array 48 or their images, the stored characters are recorded on the margin 16 of the film 18.

The digital output from the analog-to-digital converter 42 is also applied to a converter 50 which converts the digitally coded measured value to a pattern to be displayed in field 40 (FIG. 2). This pattern comprises columns of binary "1" and "0" signals which also represent the measured value, but do so in a manner which is more easily and reliably read by a scanner and computer than the human readable characters in field 38. For example, the speed value 150 (km/h) can be represented in simply binary format which would read "10010110". Instead, the ASCII codes of the three digits "1", "5" and "0" could be represented and stored in three consecutive "columns" in a pattern memory 52. When field 40 is to be written, the pattern memory 52 is read column-by-column as indicated by block 54 in FIG. 3. The binary signals of the columns are now consecutively applied to the array 48. The change-over from field 38 to field 40 and the associated representations of the measured values is symbolized by switch 56. Thereby, the pattern is transferred to the margin 16 of the film 18 in the same way as the characters of field 38.

Figure 4:
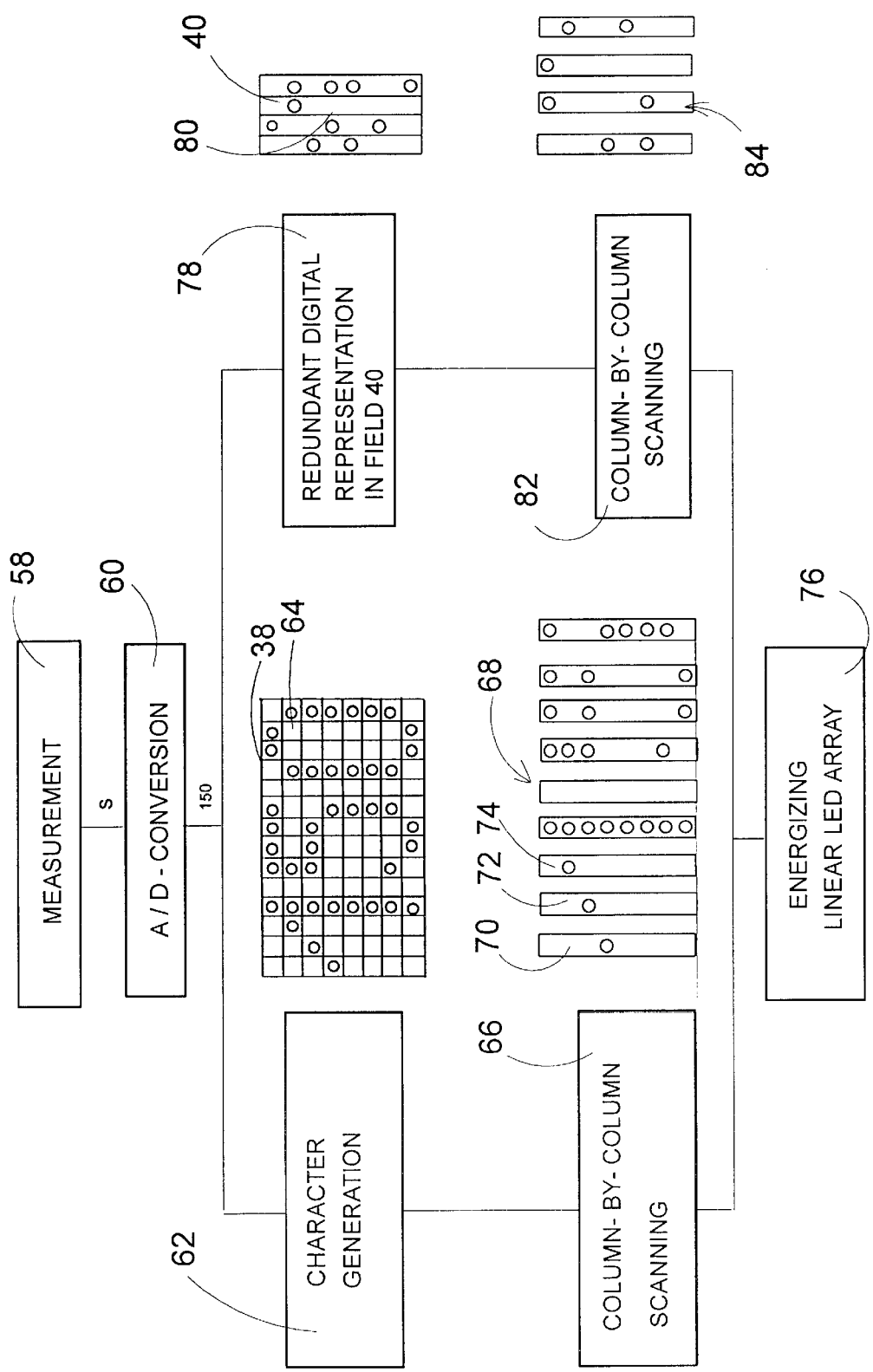
FIG. 4 is a diagram illustrating the mode of operation of the writing head.

FIG. 4 illustrates, in a slightly different way, the mode of operation of the signal processing device of FIGS. 1 and 3.

Referring to FIG. 4, block 58 represents the measurement. The measurement provides a measured value of, for example" speed "s". The measured quantity is converted to a digital representation such as "150" in ASCII code, for example". This is shown by block 60 in FIG. 4. This digital representation is processed in two ways:

In the lefthand portion of FIG. 4, human-readable characters corresponding to the digital representation are generated. This is shown by block 62 in FIG. 4. The characters are generated in the form of a matrix of binary "1"s and binary "0"s, as schematically indicated at 64. The black dots represent binary "1"s, and the blank fields represent binary "0"s. The characters generated in this way and stored in character memory 46 are then scanned column-by-column. This is shown by block 66. The consecutively read out columns are illustrated at 68. The linear LED array 48 is energized in accordance with the columns 68, i.e. during a first clock interval the LED of the first column is lit, in the second and third clock interval the LEDs 72 and 74, respectively, of the second and third columns, respectively, are lit etc. The energization of the LEDs according to the consecutive "columns" of the binary digits is shown by block 76.

In addition, the digital measured values ("150") are converted to another format of digital representation and stored for field 40. This can be in the form of a binary number and/or in the form of ASCII-codes for the individual digits. In the latter case, there would be no need for conversion, if we assume that the A/D-converter already provides the measured value in ASCII code. Preferably, the measured value is converted and stored redundantly to permit misreading to be discovered. To this end, the measured value may be stored in different formats such as binary number or ASCII code. This redundant conversion and storing is shown by block 78 in FIG. 4. The pattern stored in this way—gain as a matrix of binary states—is schematically illustrated at 80 in FIG. 4. As with the characters of field 38, the pattern of field 40 is scanned column-by-column. This is shown by block 82. The thus obtained "columns" are schematically shown at 84. After the characters have been applied to the margin 16 of the film, the pattern 80 is applied column-by-column to field 40, in the same way.

Figure 5:
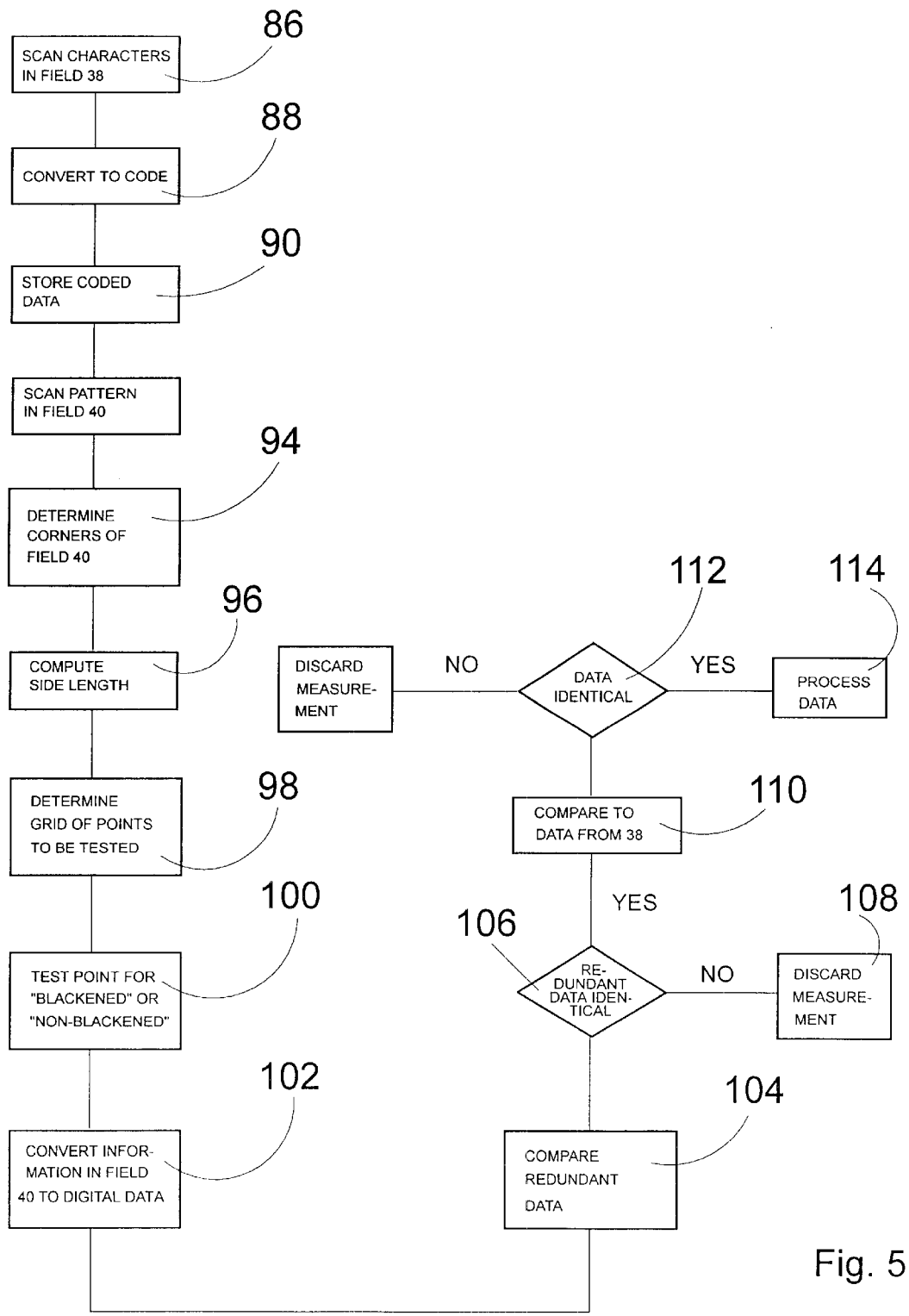
FIG. 5 is a diagram illustrating the procedure of reading the data with a scanner.

FIG. 5 illustrates the procedure, when the data representation on the margin of the film is read.

At first, the columns in field 38 are read. This is shown by block 86 in FIG. 5. This provides the writing in field 38 in the form of a matrix of binary states. This matrix is converted to coded data, for example in ASCII code. This is shown by block 88 in FIG. 5. The coded data are stored as shown by block 90.

The next step is scanning and storing the pattern in field 40. This is shown by block 92 in FIG. 5. The corners of field 40 are determined. Each of these corners is identified by three blackened spots forming a right angle, as shown in FIG. 2. The determination of the corners is shown by block 94. From the corners determined in this way, the side lengths of the rectangle of field 40 are computed. This is shown by block 96. From the side lengths, the grid of points to be tested for blackening or non-blackening is computed. This computation, which has been outlined above, is represented by block 98. A test follows, which of the points is blackened and which is non-blackened. This test is shown by block 100. From the evaluation of the pattern, information about the measured data is obtained and is converted to digital data. Advantageously, this is done column-by-column, each column containing one information such as speed as binary number or value of a digit in ASCII code. The data are obtained redundantly. This is shown by block 102 in FIG. 5. The redundantly obtained data are compared, as shown by block 104. The comparison is evaluated in accordance with diamond 106: If the redundant data are not identical ("No"), the whole measurement is discarded. This is shown by block 108.

If the redundant data are identical ("Yes"), they are compared to the coded data obtained from field 38. This is shown by block 110. A diamond 112 represents a check of whether the redundant data from field 40 are identical with the coded data from field 38 or not. If the data are identical ("Yes"), the data will be processed further, as shown by block 114. If the data are not identical ("No"), the measurement will be discarded, as shown by block 116.

I claim:

1. A method for traffic monitoring, comprising the steps of:
   measuring data related to a traffic situation including a vehicle to be monitored;
   generating a picture of a traffic scene related to said traffic situation on a photographic film;
   recording said data on said photographic film by converting said data to a first set of binary energizing signals, said energizing signals energizing recording means so as to generate a numeric or alphanumeric representation of said data on said film in a first recording field thereof; and
   converting said data to a second set of binary energizing signals, said second set of energizing signals energizing recording means so as to generate a neither numeric nor alphanumeric pattern on said film in a second recording field, said pattern representing said data in a format permitting reading of said data by a reading device and computer.

2. A method as claimed in claim 1, wherein said recording means for said second set of binary signals comprise optical writing head means for photographically applying said pattern to said second field during film feeding.

3. A method as claimed in claim 2, wherein said recording means for said first set of binary signals comprises said optical writing head means being also used for photographically applying said numeric or alphanumeric representation to said first field during film feeding.

4. A method as claimed in claim 3, wherein said optical writing head comprises an array of controllable light sources located adjacent to said film and energized during film feeding by said first said set of energizing signals in a sequence and pattern to generate a numeric or alphanumeric representation of said data in said first field and by said second set of energizing signals.

5. A method as claimed in claim 3, wherein an array of spots is defined in said second field, blackening or non-blackening of said spots represents data-dependent information by said optical writing head means, said each individual spot either being illuminated or not being dependent on said set of energizing signals.

6. A method as claimed in claim 5, wherein said second field is a substantially rectangular field having a pair of substantially parallel sides extending in the direction of film feeding and another pair of sides extending substantially perpendicular to the direction of film feeding.

7. A method as claimed in claim 6, wherein at least two corners of said rectangular second field are marked separately and independently of the data to be recorded.

8. A method as claimed in claim 1, wherein said pattern in said second field represents said data redundantly.

9. A method as claimed in claim 1, wherein said data related to the traffic situation represents a speed of the vehicle to be monitored.

10. A method as claimed in claim 1, wherein the data related to the traffic situation represents date and/or time of taking the photograph.

11. A method as claimed in claim 1, wherein said data related to the traffic situation represents a location of taking the photograph.

12. A method for traffic monitoring, comprising the steps of:
   measuring data related to a traffic situation including a vehicle to be monitored;

generating a picture of a traffic scene related to said traffic situation on a photographic film;

recording said data on said photographic film by converting said data to a first set of binary energizing signals, said energizing signals energizing recording means so as to generate a numeric or alphanumeric representation of said data on said film in a first recording field thereof;

converting said data to a second set of binary energizing signals, said second set of energizing signals energizing recording means so as to generate a neither numeric nor alphanumeric pattern on said film in a second recording field, said pattern representing said data in a format permitting reading of said data by a reading device and computer, an array of spots is defined in said second field, coloring or non-coloring of said array of spots representing data-dependent information, said secondary field being substantially rectangular and having a pair of substantially parallel sides extending in a direction of film feeding and another pair of sides extending transversely to the direction of film feeding;

wherein reading data recorded on the film in said second, substantially rectangular field consists of:

determining side lengths of said substantially rectangular field from spacing of marked corners of said substantially rectangular field;

determining coordinates of said spots as predetermined fractions of said side lengths; and determining the colored and not-colored states at the locations determined by thus obtained coordinates.

13. A method as claimed in claim 12, wherein said data related to the traffic situation represents a speed of the vehicle to be monitored.

14. A method as claimed in claim 12, wherein the data related to the traffic situation represents of date and/or time of taking the photograph.

15. A method as claimed in claim 12, wherein said data related to the traffic situation represents a location of taking the photograph.

* * * * *